Dec. 26, 1961     F. T. E. PALMQVIST     3,014,879
METHOD OF IMPROVING SEPARABILITY OF PRODUCTS
Filed Dec. 10, 1958
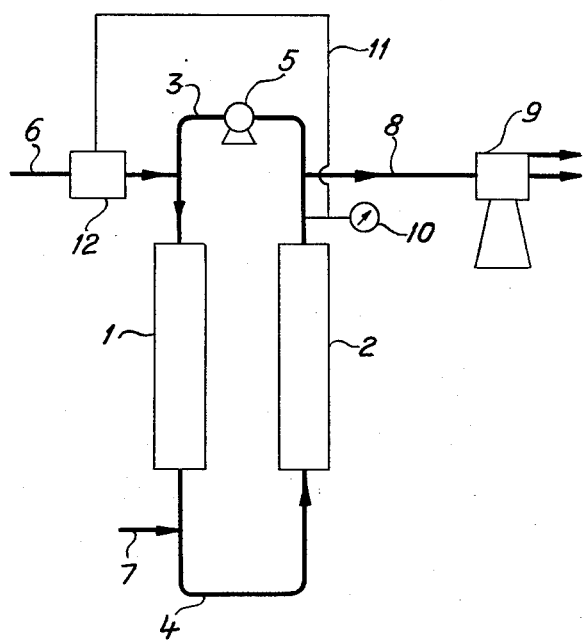
INVENTOR
Fredrik Teodor Emanuel Palmqvist
BY
Davis, Hoxie, Faithfull & Hapgood
ATTORNEYS 3,014,879
METHOD OF IMPROVING SEPARABILITY OF PRODUCTS
Fredrik Teodor Emanuel Palmqvist, Solna, Sweden, assignor to Aktiebolaget Separator, Stockholm, Sweden, a corporaiton of Sweden
Filed Dec. 10, 1958, Ser. No. 779,363
Claims priority, application Sweden Dec. 12, 1957
3 Claims. (Cl. 252—326)

In chemical or physical treatment of certain products, it may happen that an undesired emulsion is formed because in the products there exist or are formed substances which stabilize emulsions of components contained in or formed by the products. In the following, these substances are called emulsion stabilizers, although their occurrence in certain other products need not cause emulsion formation.

The principal object of the present invention is to solve the problem of destroying these emulsion stabilizers, so that formation of emulsions of the above-noted components is counteracted or avoided, whereby the components are easily separable from each other by gravity or centrifugal separation.

It is known to carry out chemical reactions in a circuit, as shown in Swedish Patents Nos. 155,349 and 148,850. The present invention, which likewise utilizes a circuit, relates to a method of improving the separability of a product into components, which product contains emulsion stabilizers counteracting the separation.

According to the invention, the product prior to the separation is treated in a circuit to which the product, as well as a reagent destroying the emulsion stabilizers, is continuously fed and from which a corresponding amount of material is continuously discharged to the separator, the circulating material (as reckoned in the flow direction of the circuit) being led, after the continuous discharge has been effected, through a zone where the reagent is added and then through a zone where the product is added. The effect of this is that the emulsion stabilizers which are especially resistant, and which thus have not been destroyed in the zone where the product is added, are subjected to repeated treatments by reagent of high concentrations, because of the repeated circulation through the zone where the reagent is added. In this manner, very resistant emulsion stabilizers are destroyed.

It should also be noted that when adding the reagent in prior methods, this is done by simply mixing it into the product. Simultaneously, the product is diluted in order to bring down the concentration of the residual emulsion stabilizers, since the reagent alone is usually incapable of reducing the tendency to emulsion formation to the desirable low level. However, owing to its high stabilizer-decomposing efficiency, the new process makes such a dilution superfluous, whereby a considerably smaller amount of waste liquid is obtained. This, in turn, simplifies the problem of disposing of this waste liquid.

The invention is explained more in detail below, reference being made to the accompanying drawing which, by way of example and schematically, shows a plant for use in carrying out the new method.

The plant comprises two reaction tanks 1 and 2 together with pipe lines 3 and 4 combining them into a circuit. In the pipe line 3 is a pump 5 for providing the circulation through the circuit. The reagent which destroys emulsion stabilizers is supplied through a pipe line 6, while the product to be treated is supplied through a pipe line 7. The withdrawal of the treated product takes place through a pipe line 8 which opens into a centrifugal separator 9. In the line 3 between the discharge pipe 8 and the tank 2, a pH-meter 10 may be inserted.

The following are examples of the practice of the invention, in which the percent-indications stand for percent by weight.

*Example 1*

Through the line 7 is fed 1000 kg. per hour of sulphate soap, diluted with water. The dilution is such that the tall-oil content of the soap is 50%. Thruogh the line 6 is fed about 70 kg. of concentrated sulphuric acid per hour. The sulphuric acid amount is determined more exactly by the pH-meter 10 which, through a suitable connection 11, automatically actuates a dosing device 12 for the sulphuric acid, this dosing device being inserted in the line 6. The pH-meter 10 is assumed to be set to keep the pH-value at 4. This means that in the reaction tank 1 the pH-value decreases to about 0.9, due to the supply of acid through the line 6. This low pH-value remains until sulphate soap enters through the line 7. The sulphate soap, which has a certain excess of alkali and contains alkali in the form of sodium soap, neutralizes the sulphuric acid at the same time as the soap is split. Thus, sodium sulphate and tall-oil are formed. This mixture passes through the reaction tank 2 and the pH-meter 10 in the line 3. From line 3, the mixture is withdrawn through pipe 8 at a rate corresponding to the rate at which sulpuhric acid and sulphate soap are fed to the circuit, while the rest of the mixture continues in the circuit.

Because the mixture circulating in the circuit is subjected to a large excess of acid in the tank 1, impurities in the sulphate soap, especially lignin, are precipitated to a very high degree. The lignin, which is a good emulsifier for tall oil, is soluble in alkaline medium but is precipitated in acid medium. The precipitation becomes more complete as the acidity of the mixture increases, and the precipitate is not redissolved as long as the pH-value is kept below 4. For this reason, the precipitate which has been obtained with a high yield in the most acid zone of the circuit, is not re-dissolved when the mixture meets sulphate soap, that is, when the pH-value of the mixture rises.

If the yield of tall oil obtained from splitting according to the present method is compared with the yield of tall oil obtained from conventional splititng (wherein acid and sulphate soap are introduced into a reaction tank provided with an agitator and the reaction mixture leaves this tank after the reaction time required), it is found that the yield of tall oil is higher with the present method. This is due to the fact that the emulsion formation has become smaller, which, in turn, can be explained by the fact that the lignin has been precipitated by the acid and has thus been destroyed as an emulsion-stabilizer.

The following table indicates yield results obtained by the conventional method as compared with the present method. In this connection, raw sulphate soap was diluted with 30% of water and split with 96% sulphuric acid. The reaction mixture in both cases was separated under the same conditions in a laboratory centrifuge. The theoretically possible yield is 100%. The pH-values given below are those at the outlet from tank 2 in the case of the present method, and those of the reaction mixture leaving the usual reaction tank in the conventional method.

| pH-value | Yield of tall oil in percent | |
|---|---|---|
| | Conventional method | Present method |
| 2 | 74.9 | 96.2 |
| 3 | 74.9 | 96.2 |
| 4 | 59.9 | 94.1 |
| 5 | 53.5 | 92.0 |

A further advantage of the present method as compared with the conventional method is that the tall oil obtained will be of a considerably higher quality, which appears from the color comparisons made in the following table. The color determinatioan was made by adding 100 ml. of benzene to 5 g. of the tall oil, whereupon the color determination was made on this solution. Low figure values for the red color indicate oil of light color.

| pH-value | Red color according to Lovibond: 50 mm. cell: yellow color = 35 | |
|---|---|---|
| | Conventional method | Present method |
| 2 | 8.2-8.6 | 7.0-7.5 |
| 3 | 8.5-9.2 | 7.4-8.0 |
| 4 | 8.8-10.0 | 7.8-8.9 |
| 5 | 15 | 8.8-15 |

When splitting sulphate soap acocrding to the new method, it is possible to keep a particularly low pH-value in the vessel 1, with accompanying advantages concerning yield and color of the recovered tall oil, since the vessel 1 can be made of especially acid-resistant material, and the movable parts also included in the plant, such as the pump 5 and the separator 10, need not come into contact with the reaction mixture until its pH-value has been increased very significantly by mixing in sulphate soap. This is important because it is difficult to make movable parts highly acid-resistant. Further, the consumption of acid is reduced because the advantages with treatment at a low pH-value can be attained without it being necessary for the entire reaction mixture to leave the plant with this low pH-value.

*Example 2*

Soapstock from peanut oil, to which water has been added so that the total content of fatty acids in the soap-stock is about 40%, is fed at a rate of 1000 kg. per hour through the line 7 of the plant shown in the drawing. Through the line 6 is fed about 93 kg. of 96% sulphuric acid per hour. This quantity is adjusted more exactly in the same way as in Example 1 by means of the pH-meter 10, which is set to maintain a pH-value of 3. Thus, a pH-value of about 0.6 is obtained in the vessel 1. During the passage through the acid zone in the vessel 1, emulsion-stabilizing substances in the soap-stock are precipitated or decomposed. As a result, the product leaving the circuit through the line 8 can easily be separated in the separator 9 into free fatty acids and acid splitting-water which contains sodium sulphate. In this experiment, the fatty acid yield was 99.2%, while it was 92.4% when the same soapstock was treated by means of the conventional method indicated in Example 1.

*Example 3*

The plant shown in the drawing is modified in that the reaction vessels 1 and 2 are steam-jacketed and provided each with a steam-heated conveyor worm. These worms aid the pump 5 in feeding the mass in the direction of the arrows.

Finely ground fish, for instance fresh herring, is fed through the line 7, and sodium hydroxide solution is fed through line 6 in such a quantity that the pH-meter 10 indicates a pH-value of 7.5-8. Thus, a considerably higher pH-value is provided in the reaction vessel 1, that is, about 9-10. During the passage through the reaction vessel 1, the cell walls consisting of proteins are decomposed very efficiently and the oil entangled in the cells is freed. These proteins serve as emulsion stabilizers for oil in water. The proteins themselves are at the same time decomposed so that their character of emulsion stabilizers is destroyed. Because of the decomposing treatment, the viscosity of the mass is reduced. The temperature is kept at about 80-90° C. The mixture, at a rate corresponding to the rate of supply through lines 6 and 7, is led off through the line 8 to the separator 9 where disentangled oil is separated from a homogenous mass of dissolved fish meat.

With this new method of treating fish meat, it has been possible to reduce the volume of the apparatus (the holding time in the plant can be kept as short as about 3-5 minutes), and it has also been possible to avoid addition of water, because by using a circuit, fresh material is fed into a circulating flow of material of low viscosity which has been subjected to decomposition. In this way, a considerable quantity of heat energy is saved for evaporation of the glue water formed.

As compared with conventional cooking, this method gives a higher yield of fat, because efficient rupture and dissolution of the cell walls has been obtained and decomposition of the proteins has been effected so that the separation takes place more efficiently. Thus, a treatment according to the present method gave a yield of 99.5% of available fatty material, while only 97.1% was recovered by treatment in the conventional manner. The cooking time was about 15 minutes in the conventional method. The structure of the cooked mass was not uniform with the conventional method, and the unrecovered fat was imbedded in solid meat particles or emulsified and entangled in coagulated protein agglomerates.

I claim:

1. A method of improving the separability of components of a product which contains an emulsion stabilizer acting to reduce the separability, said method comprising the steps of flowing the product in an endless circuit together with a stabilizer-destroying reagent, continuously adding fresh product and reagent separately to the circulating product at two different points of the circuit, and continuously withdrawing from a third point of the circuit, during circulation therethrough, a product treated for subsequent separation, said withdrawing being effected at a rate corresponding to the rate at which said fresh product and reagent are fed into the circuit, the circulating material passing said withdrawal point being led to said point at which the reagent is added and then to said point at which the fresh product is added.

2. A method according to claim 1, in which the product is passed through a first reaction zone of the circuit in flowing from said point at which the reagent is added to said point at which the fresh product is added, and the product is passed through a second reaction zone in flowing from said last point to said withdrawal point.

3. A method according to claim 1, comprising also the step of regulating the rate of adding said reagent in accordance with the pH-value of the product flowing to the withdrawal point from said point at which fresh product is added, to maintain a substantially constant pH at said withdrawal point.

References Cited in the file of this patent

UNITED STATES PATENTS

| 1,247,782 | Ayres | Nov. 27, 1917 |
| 1,617,737 | Averill | Feb. 15, 1927 |
| 1,633,941 | Hey | June 28, 1927 |
| 2,014,936 | Hendrey et al. | Sept. 17, 1935 |
| 2,135,081 | Kaplan | Nov. 1, 1938 |
| 2,266,036 | Hempel | Dec. 16, 1941 |
| 2,273,915 | Wellman | Feb. 24, 1942 |

FOREIGN PATENTS

| 480,205 | Canada | Jan. 15, 1952 |